US006435475B1

(12) United States Patent
Blume

(10) Patent No.: US 6,435,475 B1
(45) Date of Patent: Aug. 20, 2002

(54) VALVE BODY WITH INTEGRAL SEAL RETENTION GROOVE

(76) Inventor: George H. Blume, 107 Morning Cloud Cove, Austin, TX (US) 78734

( * ) Notice: Subject to any disclaimer, the term of this patent is extended or adjusted under 35 U.S.C. 154(b) by 0 days.

(21) Appl. No.: 09/835,986

(22) Filed: Apr. 16, 2001

(51) Int. Cl.[7] .................................................. F16K 1/00
(52) U.S. Cl. ....................... 251/318; 251/367; 277/316; 277/437; 137/15.18
(58) Field of Search ................................. 251/318, 331, 251/367, 366; 137/15.18, 516.29; 277/316, 437; 29/888.4

(56) References Cited

U.S. PATENT DOCUMENTS

| 1,705,800 A | * | 3/1929 | Akeyson ..................... 251/114 |
| 1,964,249 A | * | 6/1934 | Chase ......................... 137/906 |
| 2,103,503 A | | 12/1937 | White ...................... 137/41.29 |
| 2,163,472 A | | 6/1939 | Shimer ........................ 251/333 |
| 2,439,240 A | | 4/1948 | Cummings .................. 123/188 |
| 2,621,017 A | | 12/1952 | Yohpe ......................... 251/144 |
| 2,665,675 A | | 1/1954 | Sheppard .................... 123/188 |
| 2,726,843 A | | 12/1955 | Evans et al. ................. 251/333 |
| 2,903,235 A | | 9/1959 | Rodgers et al. ............. 251/332 |
| 2,904,065 A | | 9/1959 | Butlin ......................... 251/359 |
| 2,949,127 A | | 8/1960 | Malina ........................ 137/332 |
| 3,053,500 A | | 9/1962 | Atkinson ..................... 251/332 |
| 3,054,422 A | | 9/1962 | Napolitano .................. 251/334 |
| 3,107,895 A | | 10/1963 | Vogeli ......................... 251/359 |
| 3,127,905 A | | 4/1964 | Vogeli ......................... 137/334 |
| 3,164,364 A | | 1/1965 | McColl ....................... 251/334 |
| 3,174,718 A | | 3/1965 | Bowen et al. ............... 251/334 |
| 3,191,617 A | * | 6/1965 | Maddox ................. 137/516.29 |
| 3,202,178 A | | 8/1965 | Wolfe .................... 137/516.29 |
| 3,426,741 A | | 2/1969 | Haagen ....................... 251/334 |
| 3,433,250 A | | 3/1969 | Hagihara .................... 137/469 |
| 3,450,385 A | | 6/1969 | Paptzun ...................... 251/334 |
| 3,483,885 A | | 12/1969 | Leathers ................. 137/329.02 |
| 3,518,742 A | | 7/1970 | Merrill et al. ............... 29/157.1 |
| 3,742,976 A | | 7/1973 | Bailey ......................... 251/333 |
| 3,759,385 A | | 9/1973 | Yoakum ...................... 137/363 |
| 3,770,009 A | | 11/1973 | Miller .................... 137/543.19 |
| 3,874,636 A | | 4/1975 | Bake et al. .................. 251/335 |
| RE29,299 E | | 7/1977 | Estes et al. ............. 137/246.22 |
| 4,099,706 A | * | 7/1978 | Steele et al. ................ 137/269 |
| 4,140,148 A | | 2/1979 | Richter ....................... 137/240 |
| 4,180,097 A | | 12/1979 | Sjoberg .................. 137/516.29 |
| 4,194,527 A | | 3/1980 | Schönwald et al. .......... 137/543 |

(List continued on next page.)

OTHER PUBLICATIONS

"Kevlar Wearforce Composites" brochure (date and author unknown).
"Valves & Seats" brochure, Harrisburg, Inc. (1989).

Primary Examiner—Lesley D. Morris
Assistant Examiner—Patrick Buechner
(74) Attorney, Agent, or Firm—Dennis W. Gilstad

(57) ABSTRACT

A valve body having one or more integral seal retention grooves and one or more interior hollows which may be manufactured using frictional or other types of welding to join two previously formed portions through at least one cylindrical web. Forging or casting valve body portions to near-net-shape prior to joining minimizes machining necessary to achieve a final desired shape. Finish machining of certain valve body surfaces prior to joining is optional. One or more interior hollows and an integral seal retention groove are formed in the welded valve body from features present on the portions joined by welding to form the body. Such valve bodies have relatively high stiffness for their weight and require only limited machining to achieve a final shape. Increased valve durability and reduced metal wear arise from the reduced valve body weight and correspondingly reduced impact loading as the valve body moves to seal against a valve seat. An elastomeric seal may be cast and cured in place in a seal retention groove, coupled thereto through welding flash protruding into the groove.

32 Claims, 12 Drawing Sheets

U.S. PATENT DOCUMENTS

| | | | |
|---|---|---|---|
| 4,222,126 A | 9/1980 | Boretos et al. ................. 3/1.5 |
| 4,408,629 A | 10/1983 | LaFont ................. 137/329.04 |
| 4,508,315 A | 4/1985 | Livorsi et al. .............. 251/173 |
| 4,518,329 A | 5/1985 | Weaver ...................... 417/566 |
| 4,529,006 A | 7/1985 | Block et al. ........... 137/625.65 |
| 4,545,404 A * | 10/1985 | Redwine ........................ 112/7 |
| 4,597,367 A | 7/1986 | Hayashi ............... 123/188 AA |
| 4,676,481 A | 6/1987 | Hayes ....................... 251/173 |
| 4,822,000 A | 4/1989 | Bramblet ................... 251/298 |
| 4,832,769 A * | 5/1989 | Shantz et al. ............... 156/294 |
| 4,834,036 A | 5/1989 | Nishiyama et al. ..... 123/188 A |
| 4,860,995 A | 8/1989 | Rogers ...................... 251/356 |
| 4,944,977 A * | 7/1990 | Shantz et al. ................. 138/89 |
| 4,951,707 A * | 8/1990 | Johnson ................ 137/516.29 |
| 5,029,811 A | 7/1991 | Yamamoto et al. ......... 251/306 |
| 5,062,452 A | 11/1991 | Johnson ................. 137/533.25 |
| 5,082,020 A | 1/1992 | Bailey et al. .......... 137/533.21 |
| 5,088,521 A | 2/1992 | Johnson ................. 137/516.29 |
| 5,176,170 A | 1/1993 | Boyesen .................. 137/512.1 |
| 5,193,577 A | 3/1993 | De Koning ........... 137/516.29 |
| 5,249,600 A | 10/1993 | Blume .................. 137/516.29 |
| 5,275,204 A | 1/1994 | Rogers et al. ......... 137/516.29 |
| 5,328,763 A * | 7/1994 | Terry ........................... 419/14 |
| 5,345,965 A | 9/1994 | Blume .................. 137/533.25 |
| 5,392,826 A | 2/1995 | Saville et al. ............... 137/800 |
| 5,431,186 A | 7/1995 | Blume .................. 137/516.29 |
| 5,458,314 A | 10/1995 | Bonesteel ................... 251/337 |
| 5,535,784 A | 7/1996 | Saville et al. ............... 137/800 |

\* cited by examiner

VALVE BODY WITH INTEGRAL SEAL RETENTION GROOVE

FIELD OF THE INVENTION

The present invention relates generally to valves suitable for abrasive fluids, such as drilling mud, under high pressures. More specifically, the invention relates to valve bodies for use in web-seat, stem-guided valves wherein the valve body comprises at least one integral seal retention groove.

BACKGROUND OF THE INVENTION

A valve suitable for abrasive fluids such as oil field drilling mud comprises a valve body and a corresponding valve seat, with certain valve bodies incorporating an elastomeric seal within a peripheral seal retention groove. Such a valve is usually mounted in the fluid end of a pump incorporating positive displacement pistons or plungers in multiple cylinders. Such valves are frequently web-seat, stem-guided designs adapted for high pressures and repetitive high-impact loading of the valve body and valve seat. Thus, they are expensive to manufacture, especially the moving portion or valve body. Besides requiring finish machining to close tolerances for adequate sealing, such valve bodies must be made strong enough to resist significant distortion under load with resultant leaks and fatigue failures. Prior efforts to reduce distortion under load by strengthening such valve bodies have generally resulted in higher cost and/or heavier designs which exacerbate sealing problems and/or increase the stress of impact loading on components of the valve assembly.

Commercially important design improvements necessarily reflect the fact that certain mud pump valve body and seat dimensions are effectively limited by industry practices and American Petroleum Institute (API) Standards. For example, the web-seat, stem-guided designs favored for mud pump valves are commonly made compatible with the industry benchmark widely known as the TRW Mission 4-web seat, which determines many valve dimensions. Further, API Standards determine the envelope into which valve bodies and seats must fit to promote interchangeability in the field.

Given these constraints, attempts to reduce fatigue failures and/or improve valve performance have led to "improved" designs which are more expensive to manufacture and have different failure modes than earlier versions. For example, valve bodies with circular "Channel-Beam" sections may incorporate a forged bowl shape as seen, for example, in FIG. 1 of U.S. Pat. No. 5,249,600, the entire patent being incorporated herein by reference. This forged valve body has exceptional stiffness and strength.

But such valve bodies have several disadvantages in manufacture and use. First, rough valve body forging in the Channel-Beam shape require substantial material removal in finish machining of the integral seal retention groove. Second, an elastomeric seal snapped into the seal retention groove may not fully seat around the entire valve body, causing an out-of-round condition that can result in early valve failure. Third, certain portions of the valve body may be made relatively thin to reduce weight, but such thin portions require particular care during heat treatment to avoid excessive brittleness. Avoidance of thin portions, on the other hand, imposes weight penalties that result in greater impact loading. Similar disadvantages are generally present in other Channel-Beam designs, such as those described in U.S. Pat. Nos. 3,191,617; 3,202,178; 3,742,976; 4,180,097; 5,345,965; and 5,431,186, all incorporated herein by reference.

Notwithstanding their relatively high cost, however, valve bodies having an integral seal retention groove (i.e., no removable seal retention plate) such as the one-piece Channel-Beam design have gained limited industry acceptance. Their high strength and stiffness effectively counter valve body distortion about one or more radial axes (i.e., axes radiating perpendicularly from the valve body's longitudinal axis of symmetry). This type of distortion is particularly a problem on valve bodies that mate with web seats. Cyclical high pressure applied to such a valve body when it is sealed against a web seat tends to repeatedly force portions of the valve body into the spaces between the seat webs. The periphery of the disc-shaped area of the valve body (commonly called the flange) tends to wrinkle like a cupcake paper, the number of wrinkles being equal to the number of seat webs.

On multi-piece valve bodies (i.e., valve bodies having a removable seal retention plate), such cyclic loading induces fatigue that can lead to further distortion and/or failure of the valve flange. Countering such distortion by simply making the flange thicker increases total valve body weight, which in turn increases wear due to higher impact loading of both the valve body and seat. Valve bodies of Channel-Beam design minimize such distortion in part through their inherent rigidity and strength, but they weigh even more than comparable multi-piece valve bodies and so suffer the disadvantage of higher impact loads in use.

Another important disadvantage of the Channel-Beam design, as noted above, relates to seating of the seal insert. Channel-Beam valve bodies generally incorporate an elastomeric seal insert that snaps into its peripheral seal retention groove. A typical "snap-on" seal insert comprises a portion of a toroidal structure such as a plastic or rubber ring that is sized to fit tightly, and thus searingly, in the peripheral seal retention groove. When properly fitted, the elastomeric seal mates tightly with a corresponding valve seat even though the valve body is slightly distorted and even if small particles carried by the pumped fluid may be trapped between sealing surfaces. Practical advantages of such a seal insert include extended valve life and improved valve performance, but proper fitting and sealing of the elastomeric ring on a valve body is often difficult in the field.

For example, the snap-on insert may not exactly fit the Channel in a Channel-Beam valve body. The installed seal may then be out-of-round, leading to premature seal failure and subsequent failure of the valve body and web seat. When such a seal fails, leaking high-pressure fluid will jet through the initial leak path. If the valve remains in service, the leaking, jetting high-pressure fluid will literally wash away the hardened steel of the valve body and/or seat. Multiple and near-simultaneous failures of a single seal ring may give a valve body flange the appearance of a wrinkled cupcake paper.

Leaks due to seal displacement within a seal retention groove may even occur when elastomeric seals are cast and cured in place unless a special adhesive is first applied to the groove. Such bonding of the cured seal to the groove wall is expensive, and it also tends to reduce the service life of the seal due to internal stress induced as the curing elastomer tends to shrink away from the walls to which it is bound. Additionally, field replacement of such seals is not practical.

Another disadvantage of Channel-Beam valve bodies is their relatively high manufacturing cost. They are expensive to manufacture because the forging from which they are machined are not near-net-shape. Significant machining time is needed to remove excess material from the seal retention groove (the Channel). Further, because of their characteristic shape, Channel-Beam valve bodies require longer or special non-standard springs to accommodate the extra depth of the bowl.

Problems associated with high machining and materials costs, as well as seal movement and/or out-of-round seal placement, are reduced in valve bodies which incorporate a separate (removable) seal retention plate which commonly screws or bolts to the valve body to form at least part of one wall of a seal retention groove. Separate seal retention plates can be forged to near-net-shape, and they reduce the time required to correctly replace toroidal sealing rings. But they also raise valve fabrication costs and impose use restrictions. For example, they add excess weight to the moving valve body, aggravating impact loading stress. And a removable seal retention plate must be handled separately from the remainder of the valve body during manufacturing. Additionally, special skills and tools are required for proper assembly of a retention plate and seal ring on a valve body. Finally, the threads often used to secure a retention plate to a valve body are both expensive to machine and, because portions of the threads are relatively thin, they demand special protection during heat treatment. Nevertheless, removable seal retention plates are commonly used because such a plate, as well as the valve body to which it is attached in use, can be forged to a "near-net-shape" which requires relatively little finish machining to achieve a desired final shape.

Unfortunately then, even though forged valve bodies having integral seal retention groves, as in the Channel-Beam design, are inherently stronger than designs requiring a removable seal retention plate, they are generally heavier, more expensive to make, and prone to failure due to seal movement and/or out-of-round seals. What is needed is a valve body having strength and rigidity comparable to that of the Channel-Beam design without the disadvantages of high production costs, seal movement and/or out-of-round seal placement.

Attempts to overcome the cost disadvantage of forged valve bodies having integral seal retention grooves have included elimination of forging altogether, substituting cast valve bodies instead. Though such casings may be produced to near-net-shape and thereby reduce machining costs, the generally higher cost of the casting process itself, compared to forging, has substantially eliminated any hoped-for reduction in overall cost. Additionally, cast valve bodies generally have lower impact strength compared to similarly shaped forging. Thus, there is a need for a relatively light weight forged valve body incorporating the strength advantages of an integral seal retention groove and the efficiencies of initially forming to near-net-shape.

SUMMARY OF THE INVENTION

The present invention relates to valve bodies for use in web-seat, stem-guided valves wherein the valve body encloses at least one hollow and comprises at least one integral seal retention groove. Such valve bodies are relatively stiff for their weight, resisting distortion about radial axes. Preferred valve bodies of the present invention are made by joining first and second portions through at least one cylindrical web of predetermined minimum thickness. Each of the first and second portions is symmetrical about its own respective longitudinal axis, the two longitudinal axes being collinear when the respective portions are joined to form a valve body. The two collinear axes thus form the valve body's common longitudinal axis of symmetry, and each cylindrical web is radially spaced apart from and symmetrically disposed about the common longitudinal axis. Such radial spacing is measured as the perpendicular distance between the inner surface of the cylindrical web and the common longitudinal axis.

The first and second valve body portions are preferably formed to near-net-shape before being joined. Joining is preferably by frictional welding (particularly inertia welding), but may be by any means of bonding the corresponding mating surfaces on the first and second portions, including electric arc welding or electron beam welding. Corresponding mating surfaces are substantially circular and have sufficient area to allow adequate strength to be developed across the mating surfaces when the portions are joined. Preferred embodiments of corresponding mating surfaces include a substantially flat or conical washer-shaped circular mating surface on the first portion which may be brought into substantial contact with a circular mating surface of similar size and complementary shape on the second portion to form a circular contact area.

Each of the respective first and second portions preferably comprises a disc shaped body (called a flange) having first and second opposing sides. A guide stem extends perpendicularly and symmetrically from the first opposing side (that is, along the respective longitudinal axis) and thus away from a circular mating surface that is symmetrically disposed about the respective longitudinal axis on the second opposing disc side.

The mating surface(s) on at least the first valve body portion is(are) preferably on one or more cylindrical bosses arising from the disc-shaped body. When such a first portion is joined through one or more corresponding mating surfaces with a second portion in a valve body of the present invention, the cylindrical boss(es) preferably form most of the cylindrical web(s) that space apart and connect the first and second portions after the respective corresponding mating surfaces are joined (preferably by welding them together). In such an embodiment, only a single weld along each circular contact area of corresponding mating surfaces is needed to join the first and second valve body portions to form a valve body of the present invention.

A space peripherally bounded by the boss on the first valve body portion is incorporated in a hollow enclosed by the valve body (and peripherally bounded by the cylindrical web) as a result of joining the respective first and second portions. Such a hollow may additionally include space comprising, for example, one or more depressions in the first and/or second portions that do not extend peripherally beyond the respective mating surfaces and that are symmetrical about the longitudinal axis.

In alternative embodiments of the valve body of the present invention, both first and second portions may comprise a boss or both may simply have a circular mating surface without a boss. In the latter case, a separate cylindrical web structure of predetermined height may be welded (using two circular welds) between the two portions to establish the desired longitudinal spacing between the respective disc-shaped bodies (that is, the flanges) of the first and second portions.

In valve bodies of the present invention, the desired longitudinal spacing between the respective flanges is determined in part by the dimensions of the integral seal retention groove which is formed peripherally between the first and second portions after they are joined. Seal retention groove dimensions for a valve body intended, for example, be used as a replacement for another valve body previously used with a TRW Mission 4-web seat, must match analogous dimensions on the previously used valve body.

Regardless of the methods of fabrication of valve bodies of the present invention, peripheral areas of the respective disc-shaped bodies of the first and second portions substantially form the opposing walls of an integral seal retention groove in the finished valve body. A cylindrical web connecting the two opposing groove walls forms the part of the wall of the seal retention groove that is closest to the valve body's common longitudinal axis (i.e., the valve body's axis of symmetry). In such a valve body, relatively little machining is required to achieve a desired final shape because each of the first and second portions is formed to near-net-shape (with certain parts optionally machined to final shape) before the portions are joined.

As noted above, in valve bodies of the present invention either or both of the first and second valve body portions may comprise a symmetrical depression (that is, a depression symmetrical about the longitudinal axis of symmetry). The hollow or hollows formed within the valve body when such portions are joined may substantially comprise just the cylindrical space peripherally bounded by a boss comprising a mating surface on one of the valve body portions. The hollow may also be enlarged, and/or its shape may be changed, by incorporating one or two of the symmetrical depressions described above. Any such a hollow will be symmetrical about the common longitudinal axis of the valve body and will be limited peripherally by a cylindrical web.

A hollow thus formed by joining of the first and second portions to make a valve body may be totally enclosed (i.e., not in fluid communication with space outside the valve body). Alternatively, the hollow may be substantially enclosed by the valve body but in fluid communication with space outside the valve body through a fluid passage in the valve body. If present, this fluid passage must be adapted to be sealed so as to prevent fluid entry into the hollow when the valve body is put into service.

The presence or absence of such a fluid passage affects the structure of the finished valve, particularly during carburization. When present, such a passage is preferably formed (as, for example, by drilling) longitudinally in one of the two guide stems. Any such passage is preferably plugged (as, for example, by a welded plug) before the valve body is put into service to prevent drilling mud or other foreign matter from entering the hollow enclosed by the valve body and thus adding weight (perhaps asymmetrically) to the valve body.

The presence of one or more hollows within a valve body of the present invention confers several advantages. Necessary flange stiffness is maintained while the mass of the valve body is reduced, thus reducing impact loading. Adequate valve body stiffness is maintained through the action of one or more cylindrical webs in conjunction with the flanges. Reducing impact loading while maintaining adequate valve body stiffness reduces the incidence of fatigue fractures and extends the service life of elastomeric seals, corresponding valve seats, and the valve bodies themselves.

In a preferred embodiment of a valve body of the present invention, a single interior hollow is substantially symmetrical about the valve body's common longitudinal axis. The single hollow extends symmetrically along radial axes from the common longitudinal axis peripherally to the cylindrical web, as well as extending along the longitudinal axis to the two disc-shaped bodies (flanges) of the valve body's respective first and second portions. Should multiple interior hollows be desired, a single cylindrical interior hollow, for example, may be subdivided into a smaller (central) cylindrical hollow plus one or more toroidal spaces symmetrical about the valve body's common longitudinal axis by the inclusion of one or more additional concentric cylindrical webs. Each web present extends between and thus spaces apart and connects the two disc-shaped bodies that are thus joined in the completed valve body. Inclusion of a center post symmetrical about the longitudinal axis in this example would result in conversion of the smaller cylindrical hollow into an additional (concentric) toroidal shaped hollow enclosed within the valve body.

Each cylindrical web in a valve body of the present invention functions in conjunction with the flanges in a manner analogous to the web of an I-beam. Thus, a cylindrical web imparts resistance to deformation of the valve body about any radial axis. Bending stress about any radial axis, tending to cause wrinkling of the periphery of the valve body, will largely result in corresponding tensile and compressive stresses in adjacent parts of the disc-shaped bodies (that is, flange regions), with relative sparing of the web itself. For this reason, the web thickness can be, and preferably will be, less than the thickness of the respective flange regions where they connect with the web in the finished valve body.

Note that in embodiments of the valve body of the present invention which comprise a plurality of cylindrical webs, the structure resisting bending of the valve body about a radial axis will resemble one or more box beams rather than an I-beam. In such embodiments, two or more concentric cylindrical webs form the box beam webs, and these webs space apart and connect the compression-resisting and tension-resisting members (the flange regions). As described above, distortion about one or more radial axes will result primarily in tension and compression forces in the flange regions with relative sparing of the box beam webs (which can then be made relatively thinner).

Thus, valve bodies of the present invention, whether comprising one or a plurality of interior hollows, are strong and stiff but relatively light-weight compared to competing designs. They are relatively easy to fabricate and require relatively little finish machining. They can reduce overall impact stress concentrations near sealing surfaces of the valve body and valve seat, resulting in improved durability and reduced wear in other components of valve assemblies in which such valve bodies are used.

DETAILED DESCRIPTION OF PREFERRED EMBODIMENTS

Figure 1:
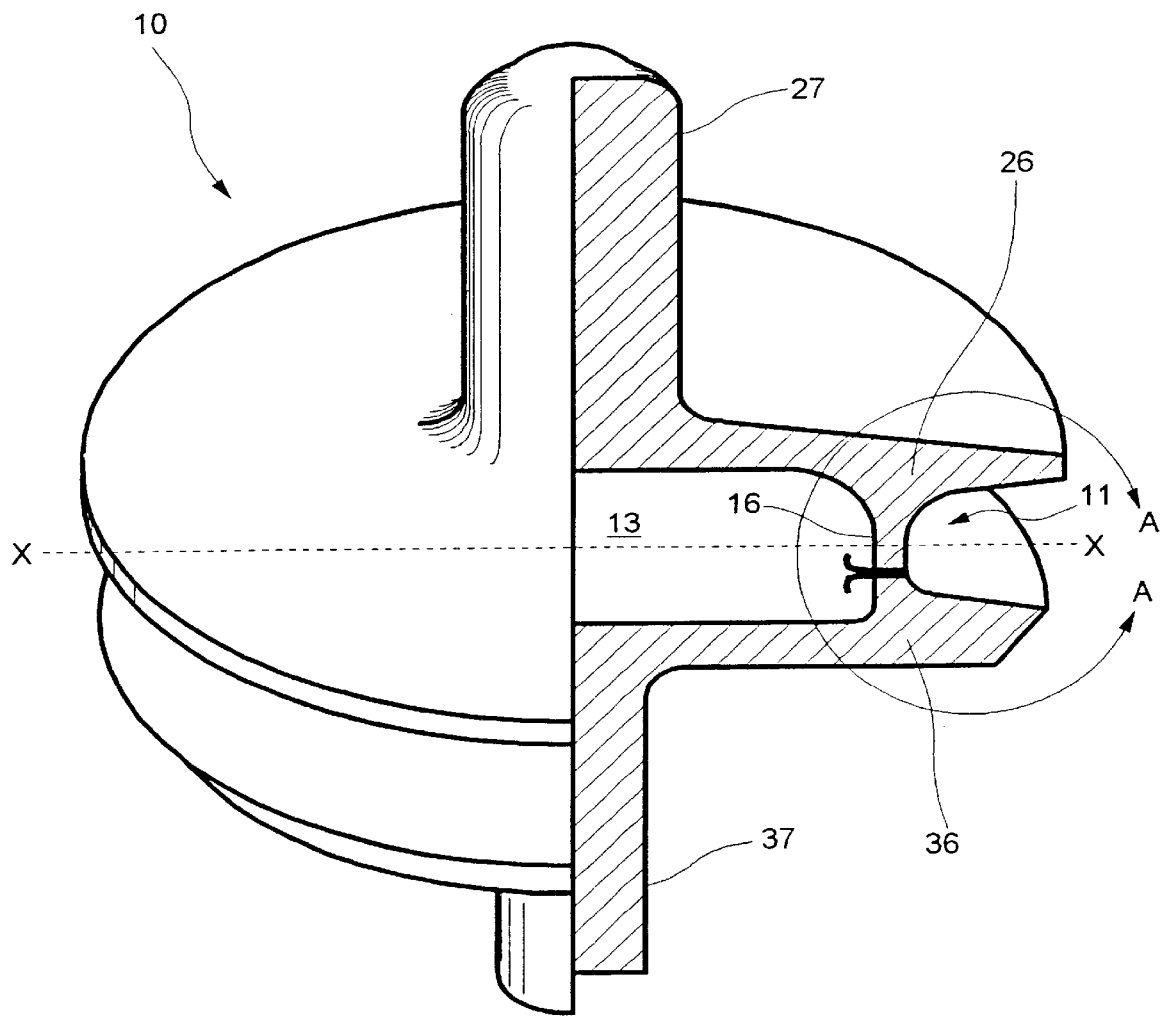
FIG. 1 illustrates a schematic view with partial cross-section of a valve body of the present invention for use in web-seat, stem-guided valves; the valve body totally encloses a single hollow.

FIG. 1 illustrates a schematic view with partial cross-section of a valve body 10 of the present invention for use in web-seat, stem-guided valves. Valve body 10 comprises integral seal retention groove 11, cylindrical web 16, first and second guide stems 27 and 37 respectively, and hollow 13. Seal retention groove 11 is machined smooth to accept a snap-on elastomeric seal. The area encircled by line A—A functions in a manner analogous to an I-beam to resist deformation (i.e., wrinkling) of the valve body about radial axis X—X. Note that the illustrated cross section encircled by line A—A in FIG. 1 suggests an I-beam shape, with the relatively lighter cylindrical web 16 positioned analogously to a web connecting the relatively heavier flange regions 26 and 36. In conjunction with its impact on a valve seat, the periphery of disc-shaped valve body 10 tends to be displaced in a direction substantially parallel to the (longitudinal) axis of symmetry of valve body 10. Such displacement tends to wrinkle the periphery in a manner somewhat analogous to that observed in a cupcake paper. This manner of wrinkling, in turn, potentiates bending or distortion substantially about a plurality of radial axes (i.e., axes radiating perpendicularly from the longitudinal axis of symmetry of the valve body).

Bending about any such radial axis, however, is resisted by a combination of tension in flange region 26 and compression in flange region 36 or vice versa, depending on the direction of bending. The separation (that is, spacing apart) of flange regions 26 and 36 which is affected by cylindrical web 16 thus substantially increases the stiffness of valve body 10 with relatively little increase in weight.

Note that in certain preferred embodiments of valve body 10 for oil field service, the diameter of first guide stem 27 is determined by API standards, while the diameter of second guide stem 37 is determined by the size of the corresponding guide stem hole in a TRW Mission 4-web seat commonly used in the oil industry. Note also that valve bodies of the present invention such as valve body 10 in FIG. 1 can be used with standard length valve springs in web-seat, stem-guided valves. Older designs such as the Channel-Beam configuration, in contrast, require longer valve springs in general because of the characteristic bowl-shaped depression present in the valve body.

Figure 2A:
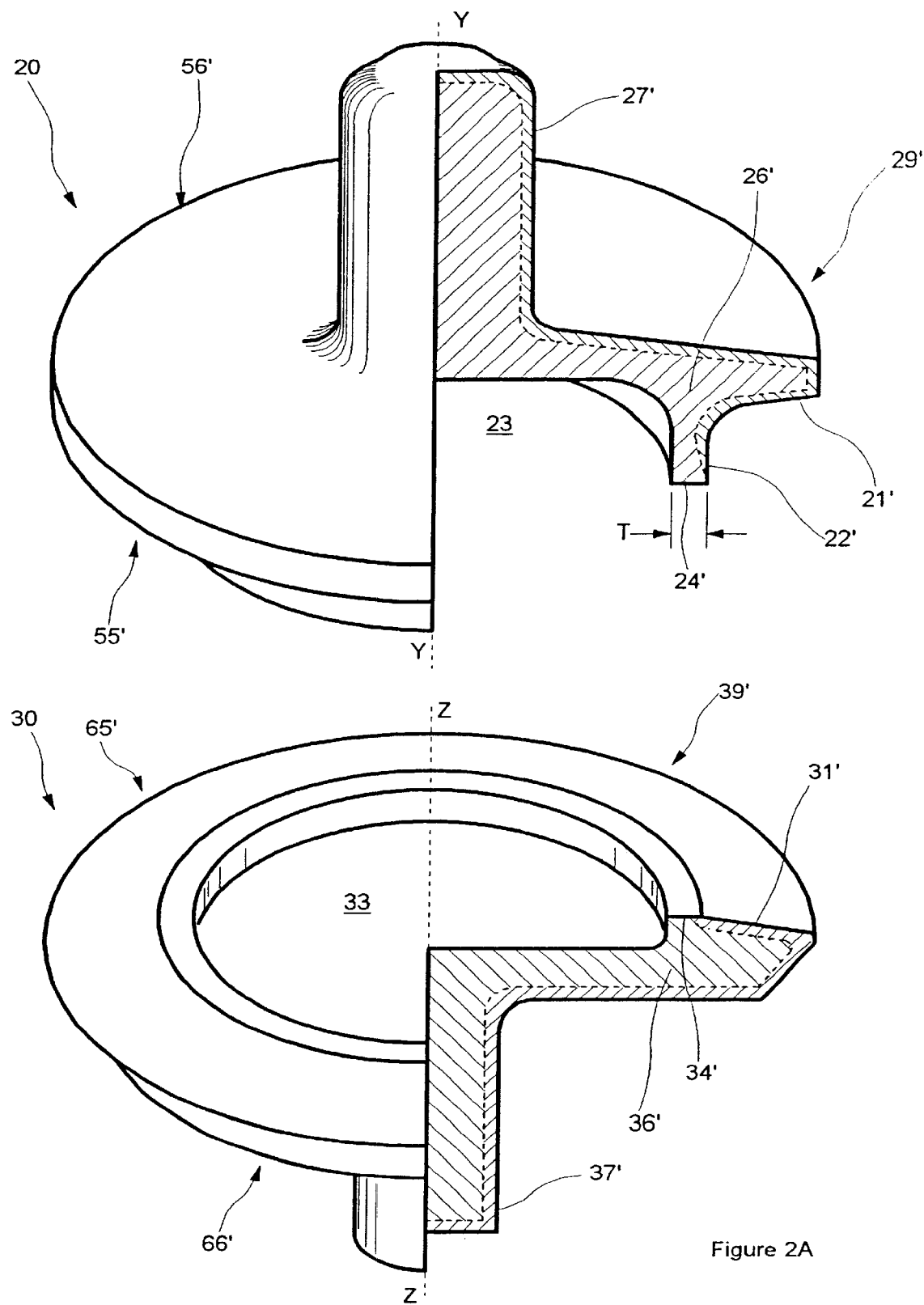
FIG. 2A schematically illustrates partial cross-sections showing first and second portions of a near-net-shape valve body of the present invention prior to joining of the portions.
Figure 3:
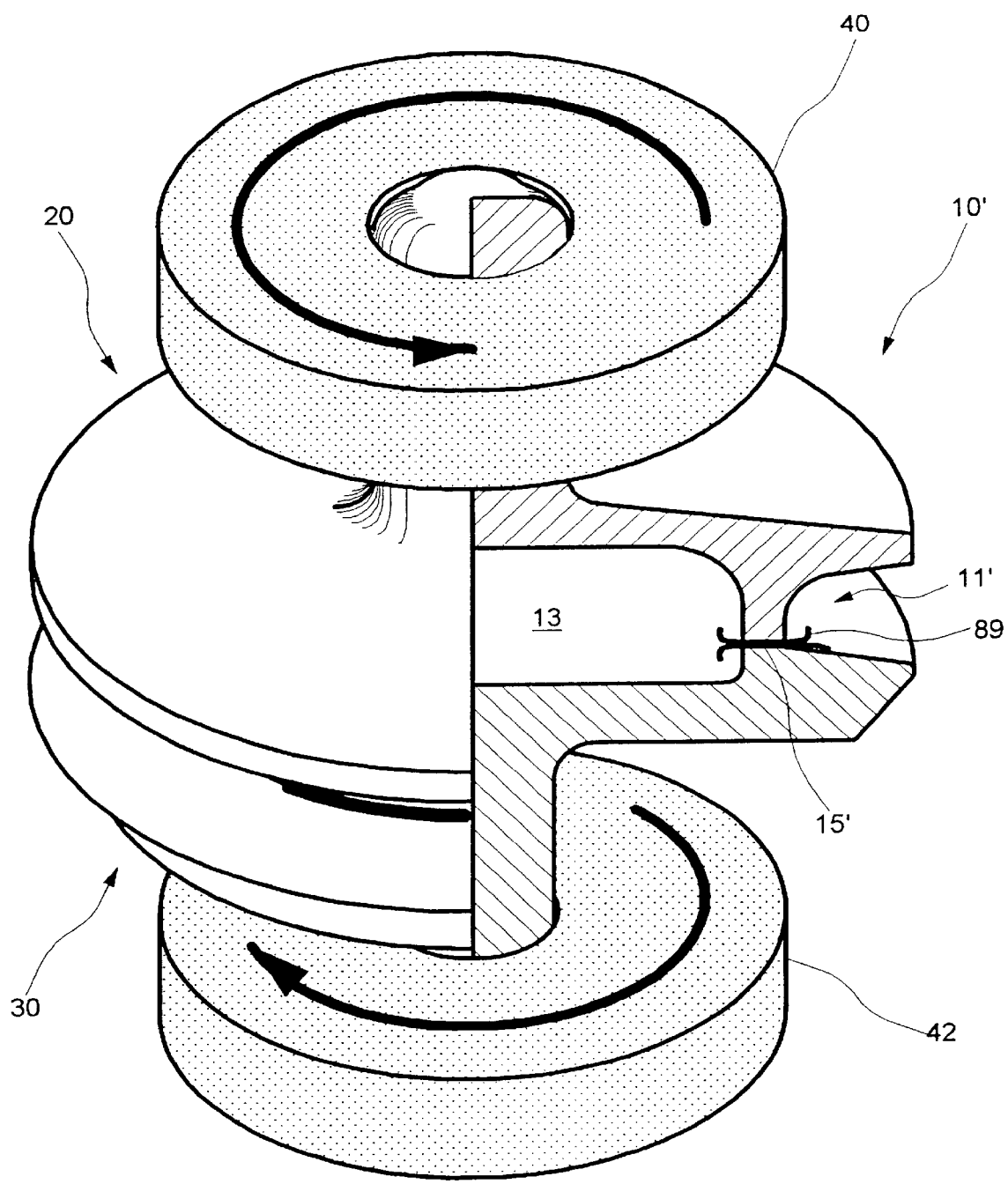
FIG. 3 schematically illustrates relative motion of the two portions of a valve body to facilitate frictional welding for joining the two portions.

FIG. 2A schematically illustrates partial cross-sections showing a near-net shape first portion 20 and a near-net-shape second portion 30 before they are joined to form a near-net-shape valve body 10' as seen in FIG. 3. A near-net-shape valve body 10' can be finish machined to the form of valve body 10 as shown in FIG. 1 by removal of relatively little material, compared to the material removal that would be required if a valve body of similar external shape were forged in one piece. For severe valve service conditions, both portion 30 and portion 20 are preferably forged (instead of, for example, being cast) in an appropriate metal such as mild steel to near-net-shape.

First portion 20 is forged symmetrically about a first longitudinal axis y—y. First portion 20 comprises a first disc-shaped body 29' having first and second opposing sides, 55' and 56' respectively, and flange region 26' which is adjacent to cylindrical boss 22'. The first opposing side 55' of disc-shaped body 29' comprises cylindrical boss 22', circular boss mating surface 24' and one of two opposing integral seal retention groove walls, groove wall 21'. Note that primes on labels such as groove wall 21' and flange region 26' denote the respective structures prior to finish machining. A substantially cylindrical space 23 is peripherally bounded by boss 22' on said first opposing side 55' of first disc-shaped body 29', and a first guide stem 27' extends from second opposing side 56' of first disc-shaped body 29', extending away from substantially cylindrical space 23 along longitudinal axis y—y. Substantially cylindrical space 23 is peripherally limited by cylindrical boss 22', cylindrical boss 22' comprising a circular boss mating surface 24' and having a wall thickness T measured at cylindrical boss mating surface 24. The wall thickness of cylindrical boss 22' preferably tapers from a relatively greater value at the boss base (adjacent to flange region 26'), which includes fillets for stress relief, to a smaller and substantially uniform value near the circular boss mating surface 24'. The wall thickness of cylindrical boss 22' will thus preferably be everywhere equal to or greater than T (the wall thickness at the cylindrical boss mating surface 24). Note that small inconsistencies in thickness of a cylindrical web 16 (which is substantially formed from cylindrical boss 22' upon joining of the first and second portions) are associated with methods of joining (such as frictional welding, electron beam welding, or electric arc welding). Specifically, for example, welding flash will generally protrude from a frictional weld into adjoining areas, and this flash may either be machined from accessible surfaces or it may be left in place in certain preferred embodiments.

Second portion 30 is forged symmetrically about a second longitudinal axis z—z. Second portion 30 comprises a second disc-shaped body 39' having first and second opposing sides 65' and 66' respectively and flange region 36' adjacent to circular mating surface 34'. The first opposing side 65' of second disc-shaped body 39' comprises corresponding circular mating surface 34'. Surface 34' corresponds to (i.e., is sized and shaped to allow substantially complete contact with) circular boss mating surface 24'. Note that circular mating surfaces 24' and 34' in near-net-shape portions 20 and 30 may or may not be machined before the portions are joined. Machining the mating surfaces before joining would generally reduce the energy required for a frictional weld and would also reduce the amount of welding flash produced during frictional welding.

First opposing side 65' also comprises coaxial symmetrical depression 33 and one of two opposing integral seal retention groove walls, groove wall 31'. A second guide stem 37' extends from second opposing side 66' of second disc-shaped body 39', extending away from circular depression 33 along longitudinal axis z—z. Note that as discussed above, symmetrical depression 33 (or an analogous space) may or may not be present in alternative embodiments of valve bodies of the current invention when cylindrical space 23 (or an analogous space) is also present. Note also that primes on labels such as groove wall 31', second guide stem 37', and flange region 36' denote the respective structures prior to finish machining.

Figure 2B:
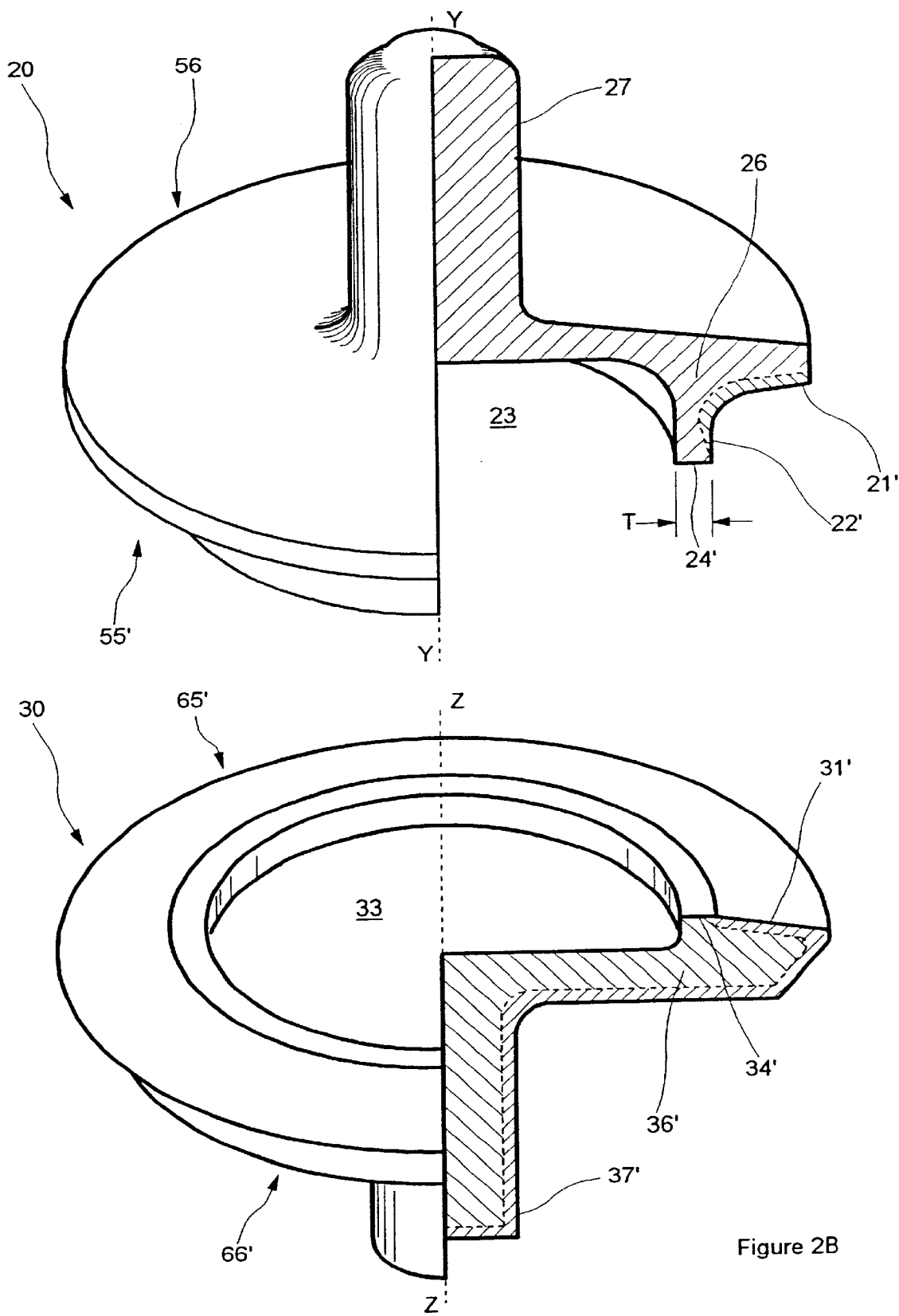
FIG. 2B schematically illustrates partial cross-sections showing first and second portions of a valve body of the present invention prior to joining of the portions as in FIG. 2A, except that finish machining has been applied to the upper part and periphery of the first portion, including the guide stem.
Figure 2C:
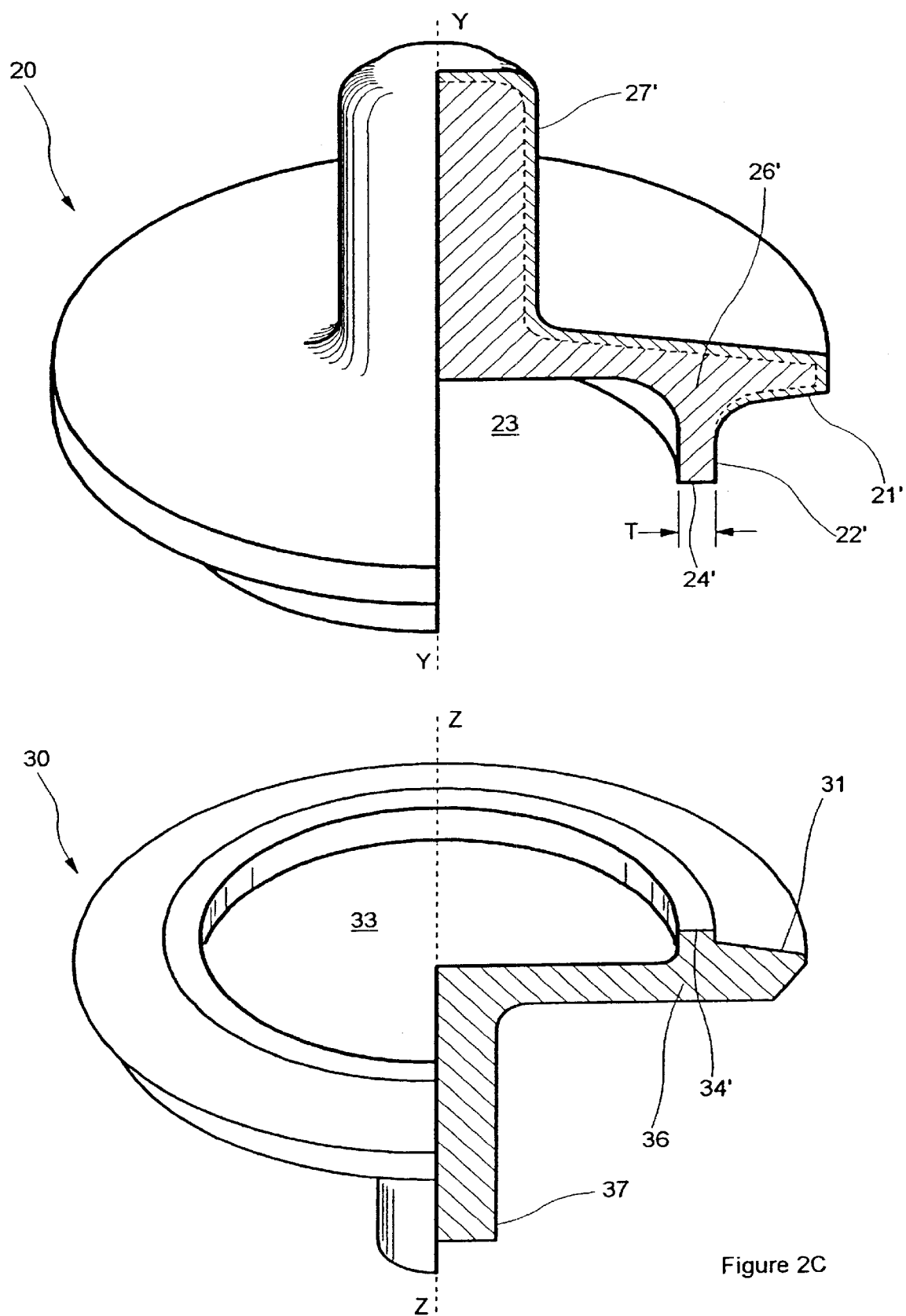
FIG. 2C schematically illustrates partial cross-sections showing first and second portions of a valve body of the present invention prior to joining of the portions as in FIG. 2B, except that finish machining has been applied additionally to areas of the second portion that will form part of the seal retention groove.

In various embodiments of the present invention, certain finish machining steps may preferably be performed either before or after joining of first and second portions. For example, in a finished valve body of the present invention, the longitudinal axes of symmetry of first guide stem 27 and second guide stem 37 are necessarily colinear, thus forming the longitudinal axis of symmetry of the finished valve body. Because of slight misaligned of these two axes which might become apparent after joining of the first and second portions, it may be preferable not to finish machine both guide stem 37 and guide stem 27 before the portions are joined. By delaying finish machining of one or both of the first and second guide stems until after joining of the first and second portions, any slight misaligned of either guide stem axis that becomes apparent after joining can be corrected in the finished valve body. For example, FIG. 2B schematically illustrates that final machining of guide stem 27 and side 56 (including the periphery of portion 20 and flange region 26) has been accomplished prior to mating of the first and second portions in preparation for joining, whereas guide stem 37' remains near-net-shape (that is, not finish machined) until after joining.

Where precise alignment of machined surfaces on the first and second portions is less critical, as in the opposing walls of a seal retention groove for a seal that is to be cast and cured in place, finish machining of the groove walls may be accomplished before the joining of the first and second portions of a valve body. On the other hand, where seal retention groove dimensions are critical, as in the spacing of opposing walls of a groove for a snap-on seal, finish machining of at least one groove wall must be delayed until after the first and second portions are joined. When the first and second portions can be handled individually, surfaces that can be machined before joining are preferably machined then because they are more readily accessible than they would be after joining. This easy access means quicker machine set-up times and reduced machining costs. For example, FIG. 2C schematically illustrates final machining of certain surfaces (including guide stem 37 and groove wall 31) prior to joining of the first and second portions, leaving final machining of other surfaces (as, for example, of guide stem 27' and groove wall 21') to be completed after joining. Because of its proximity to mating surface 34' (where welding flash may be present after joining) the adjacent area of groove wall 31 is more accessible for any desired final machining prior to joining of the first and second portions than it would be after joining.

To make a valve body of the present invention, first portion 20 is joined to second portion 30, preferably with a weld at the junction of mating surface 24' of cylindrical boss 22' and corresponding mating surface 34'. Note that both cylindrical boss mating surface 24' and corresponding mating surface 34' are surfaces of substantially identical dimensions and complementary shape, so that the two mating surfaces may be brought into substantially complete contact with each other to form a circular contact area. After joining of the first and second portions 20 and 30 respectively (as, for example, by frictional welding), any necessary finish machining (for example, that of one or both guide stems and/or parts of seal retention groove 11) is completed as needed to produce a finished valve body 10.

Figure 5A:
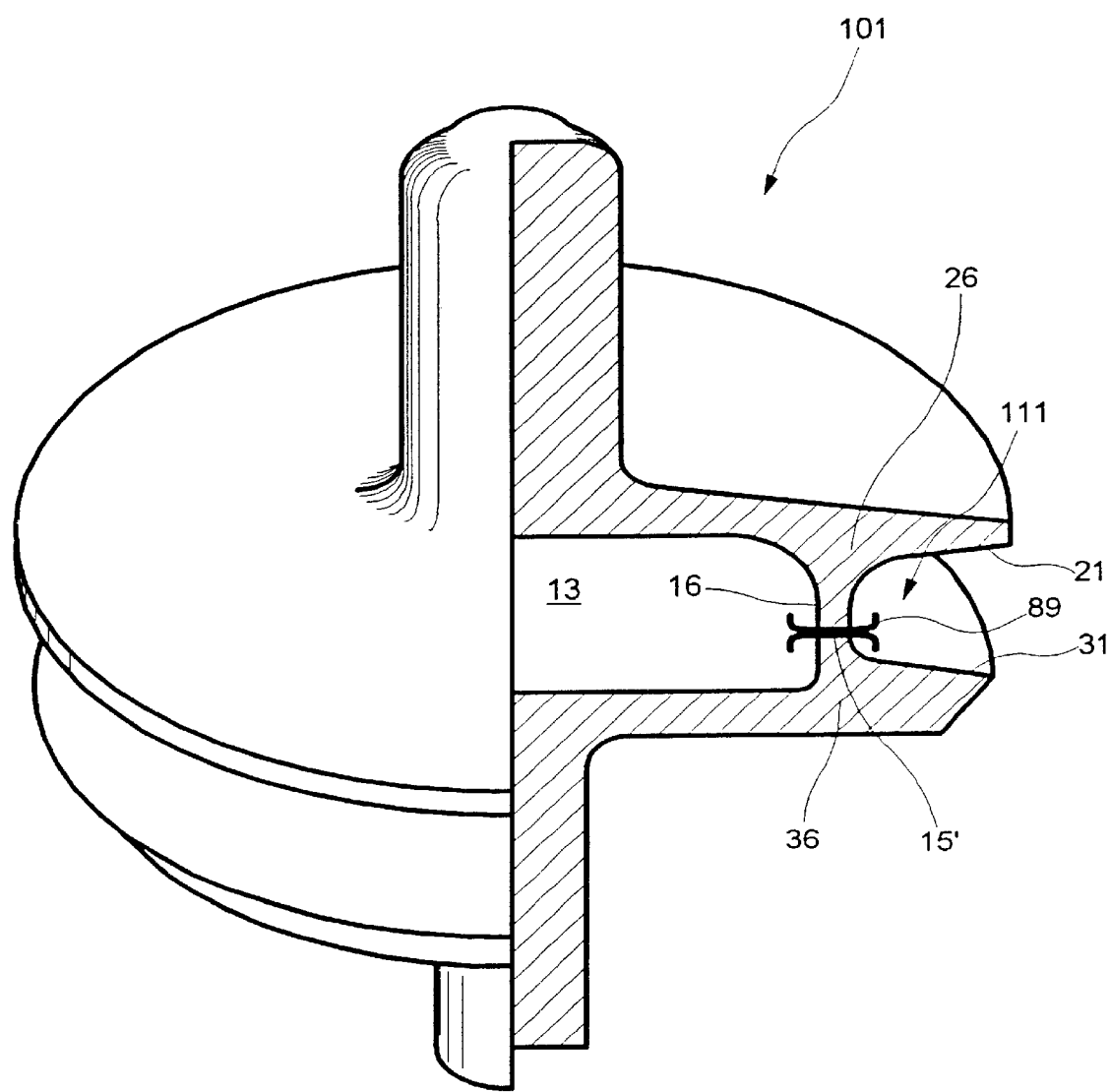
FIG. 5A schematically illustrates a partial cross-section of the valve body of FIG. 4 after machining to a final desired shape; the valve body totally encloses a hollow.

Structures in the finished valve body 101, as illustrated and labeled in FIG. 5A, are formed as follows. Cylindrical boss 22 on first portion 20 will form part of a cylindrical web 16 which, in turn, will form the part of the wall of the integral seal retention groove 111 that is closest to the valve body's longitudinal axis of symmetry (i.e., that part of the groove wall which lies between and connects its two opposing walls 21 and 31; the part of portion 20 labeled 21' in FIGS. 2A, 2B and 2C will form part of a first opposing wall, labeled 21 in FIG. 5A because it is a finished machined part of integral seal retention groove 111. The part of portion 30 labeled 31' in FIGS. 2A and 2B will form part of a second opposing wall, labeled 31 in FIG. 5A because it is a finished machined part of integral seal retention groove 111. And the hollow 13 (labeled in FIG. 5A) will be substantially formed from the combination of cylindrical space 23 and circular depression 33 shown in portions 20 and 30 respectively in FIGS. 2A, 2B and 2C. Note that finished valve body 101 in FIG. 5A is similar to finished valve body 10 in FIG. 1 except that welding flash 89 protrudes into seal retention groove 111 of valve body 101, whereas there is no such protrusion into seal retention groove 11 of valve body 10.

In making preferred embodiments of a valve body of the present invention for applications where fatigue failure is a dominant concern, portions 20 and 30 are preferably both forged. In alternative preferred embodiments, one portion may be cast while the other is forged. While forging imparts a desirable grain structure to metal, making it relatively resistant to failure under repeated impact loads, casting may be more suitable than forging for manufacturing relatively complex shapes. Preferred embodiments of the invention in which both portions 20 and 30 are forged are suitable for applications requiring excellent impact resistance, whereas a combination of desired characteristics (such as good impact resistance with a relatively complex functional shape) can be achieved when one of the portions 20 and 30 is forged and the other is cast.

FIG. 3 schematically illustrates inertia wheels 40 and 42 being coupled to portions 20 and 30 respectively and rotating as indicated to establish relative motion between portions 20 and 30 where the portions' corresponding mating surfaces contact at 15' (which will be the site of a frictional weld, from which welding flash will protrude into hollow 13 and into seal retention groove 11'). Note that relative motion may be established as indicated by counter-rotation of inertia wheels 40 and 42, or by one inertia wheel rotating faster than the other but in the same direction, or by one inertia wheel being stopped and the other one rotating. Note further that portions 20 and 30 may also be joined by any other suitable method known to those skilled in the art. Such methods include electric arc welding or electron beam welding or any other method which, after finish machining, results in a junction 15 (as seen, for example, in FIG. 5A) having sufficient strength to maintain the integral character of the seal retention groove in use.

Figure 4:
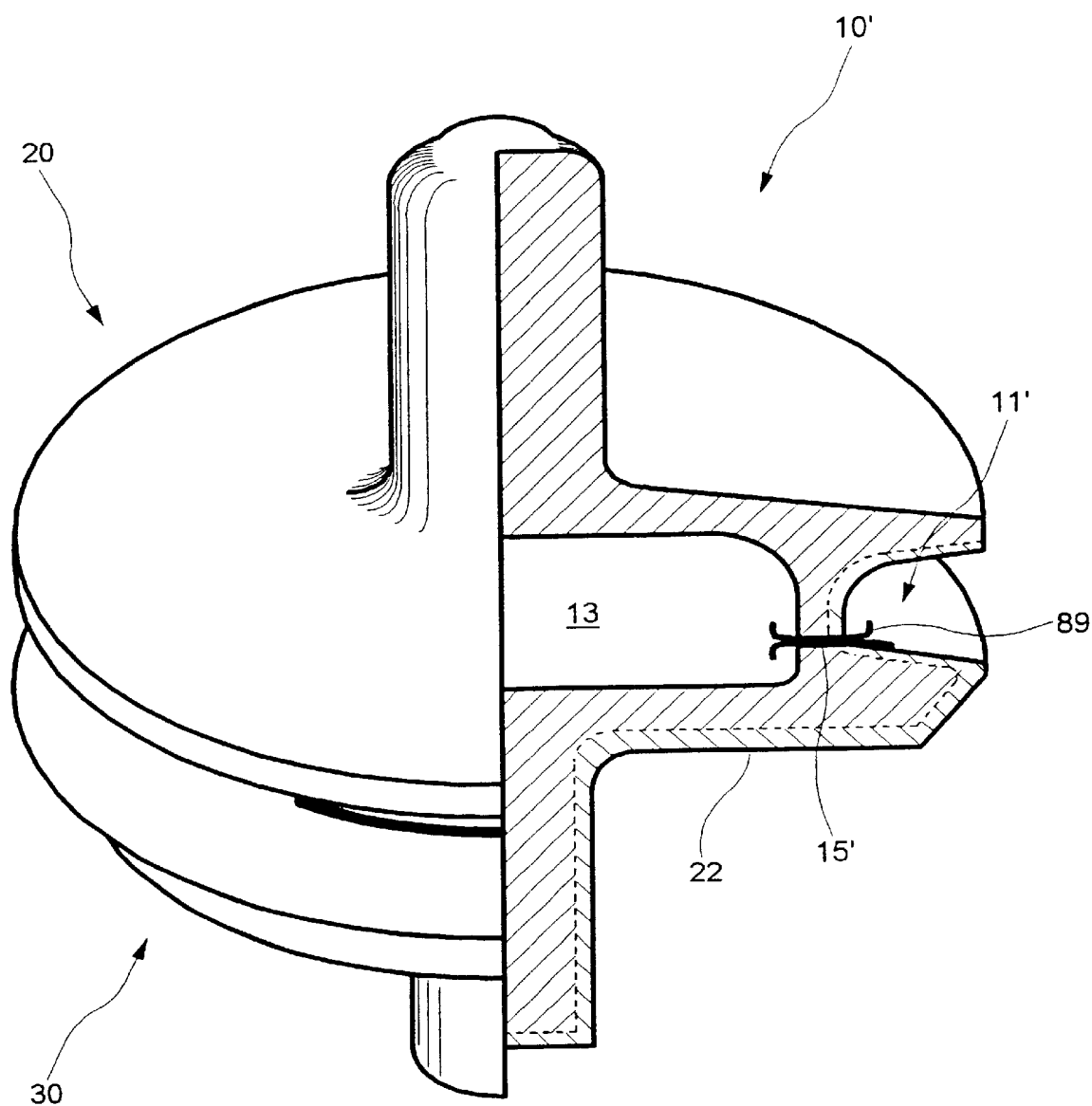
FIG. 4 schematically illustrates a partial cross-section of the two portions shown in FIG. 3 welded together to form a near-net-shape valve body.

FIG. 4 schematically illustrates a partial cross-section showing weld 15' joining portions 20 and 30 to form near-net-shape valve body 10' of the present invention. Valve body 10' comprises a hollow 13 and a near-net-shape integral seal retention groove 11' into which welding flash 89 protrudes. The dashed line in the cross-sectional view schematically demarcates the reverse cross-hatched area 22 which indicates material (including welding flash 89) that will be removed during final machining to form a finished valve body 10 as shown in FIG. 1.

Figure 5B:
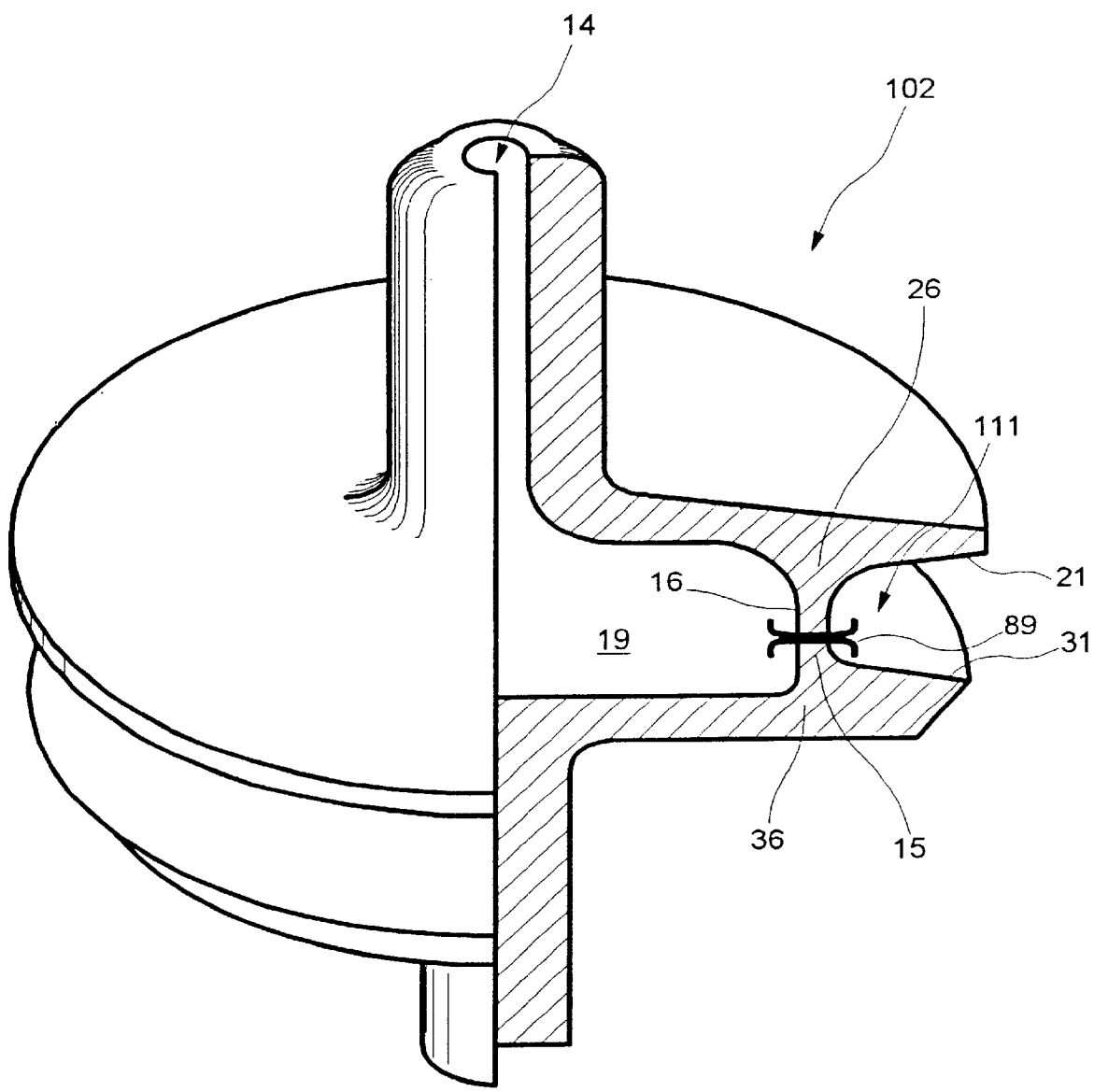
FIG. 5B illustrates a schematic view with partial cross-section of an alternative embodiment of the valve body shown in FIG. 5A; the illustrated hollow is not totally enclosed but instead has fluid communication with space outside the valve body.

Note that although hollow 13 is shown totally enclosed by portions 20 and 30 and weld 15', communication between space outside valve body 10' and an interior hollow may exist in other preferred embodiments as schematically illustrated by the example in FIG. 5B.

The view of valve body 101 in FIG. 5A schematically illustrates opposing walls 21 and 31 of seal retention groove 111 after machining to final shape. Junction 15' is part of cylindrical web 16, but its accompanying welding flash 89 is not finish machined at all in the otherwise finish machined valve body 101 in FIG. 5A. Instead, the welding flash 89 remains extruded into seal retention groove 111 and hollow 13. When the preferred embodiment of FIG. 5A is to be produced, opposing wall 31 of seal retention groove 111 is preferably finish machined before joining of portions 20 and 30. The continued presence of welding flash 89 in groove 111 after joining would complicate any finish machining of opposing wall 31' that might be attempted after joining.

Welding flash 89 comprises a relatively small amount of exceptionally hard, rough metal, often of convoluted shape, that lies adjacent to mating surfaces after the surfaces are joined together by welding. Consequently, welding flash generally protrudes from the weld junction of portions 20 and 30 into an integral seal retention groove on a valve body of the present invention, Further, welding flash is relatively difficult to remove from the groove, even after heating of the valve body in an annealing furnace.

Figure 8:
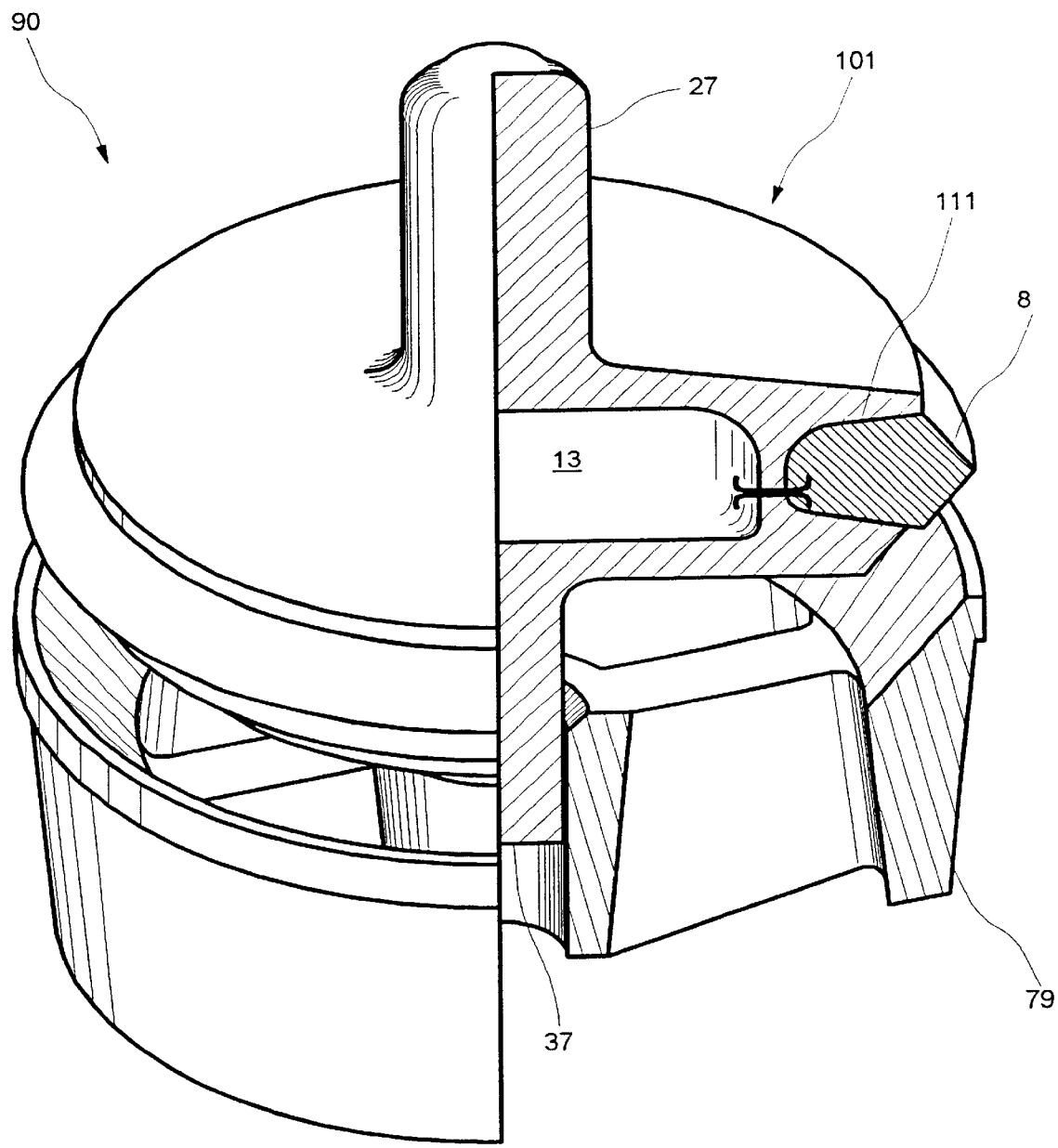
FIG. 8 schematically illustrates a valve assembly comprising a 4-web valve seat, a valve body according to the present invention, and an elastomeric seal within the integral seal retention groove of the valve body.

The presence of welding flash in a seal retention groove increases the difficulty of properly fitting a snap-on elastomeric seal ring into the groove. Thus, when a valve body 101 of the present invention is fitted with an elastomeric seal 8 (as shown in FIG. 8), an elastomer is preferably cast and cured in place within seal retention groove 111. The welding flash 89 that protrudes into seal retention groove 111, as in FIG. 5A and FIG. 8, will simply be enveloped by the elastomer as a seal 8 (as shown in FIG. 8) is being cast in place in the groove. After curing of the elastomeric seal 8, the welding flash 89 will be tightly coupled to the seal 8. Seal 8 is thus firmly anchored within seal retention groove 111, and relative movement of the seal in the groove is limited, making leaks and/or seal failure less likely.

Valve body 102 in FIG. 5B is similar to valve body 101 as shown in FIG. 5A except for the presence of longitudinal fluid passage 14 which allows fluid communication between space outside valve body 102 and interior hollow 19. The presence or absence of such communication is important, for example, during heat treatment (carburization) to harden certain surfaces of a valve body for increased wear resistance.

Carburized metal is harder but less ductile compared to metal that is not carburized. Carburizing involves infusing gaseous carbon into valve body surfaces over several hours in a furnace. The valve bodies are then quenched and tempered to produce a very hard and wear-resistant case on surfaces exposed to carburizing furnace gases. The hardened case is strong and relatively brittle, but the metal underlying the hardened case remains more ductile and therefore able to resist fatigue cracking.

Figure 6:
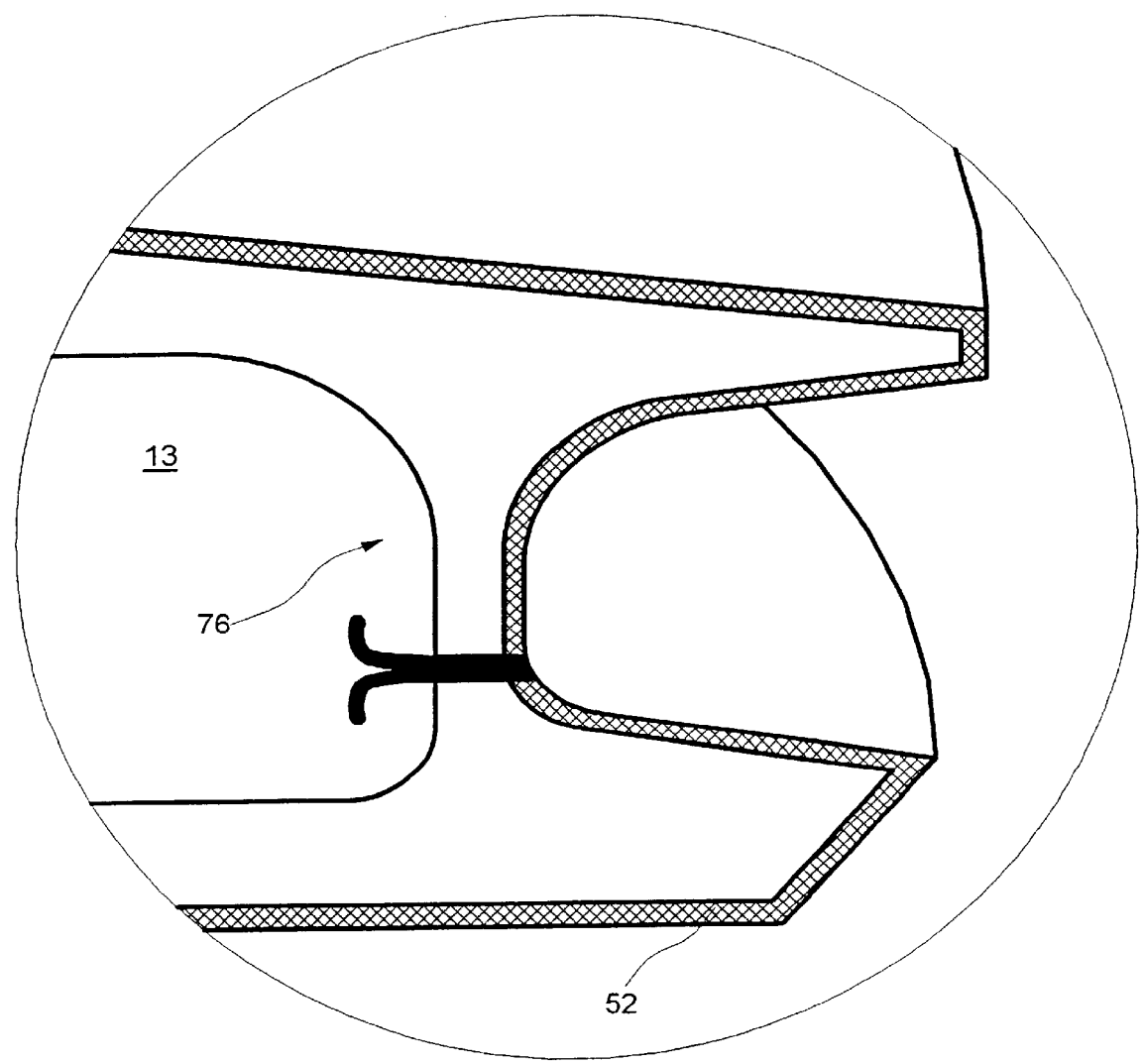
FIG. 6 schematically illustrates effects of carburization on surfaces of a valve body having a totally enclosed hollow.

During heat treatment of valve body 10 as shown in FIG. 1, carburization of interior surfaces of the totally-enclosed hollow 13 will not take place due to the absence of fluid communication between hollow 13 and space outside the valve body, including the gaseous carburizing agents in the heat treating furnace. In such a valve body, carburization will be limited to exterior valve body surfaces as schematically indicated by the crosshatched (carburized case) surface layer 52 in FIG. 6. Note that web 76 is carburized on one side only and that there is no welding flash protruding from the right side of web 76 into the seal retention groove, in contrast to the welding flash protruding from the left side of web 76 into hollow 13. The seal retention groove is thus configured to accept a snap-on elastomeric seal.

Figure 7:
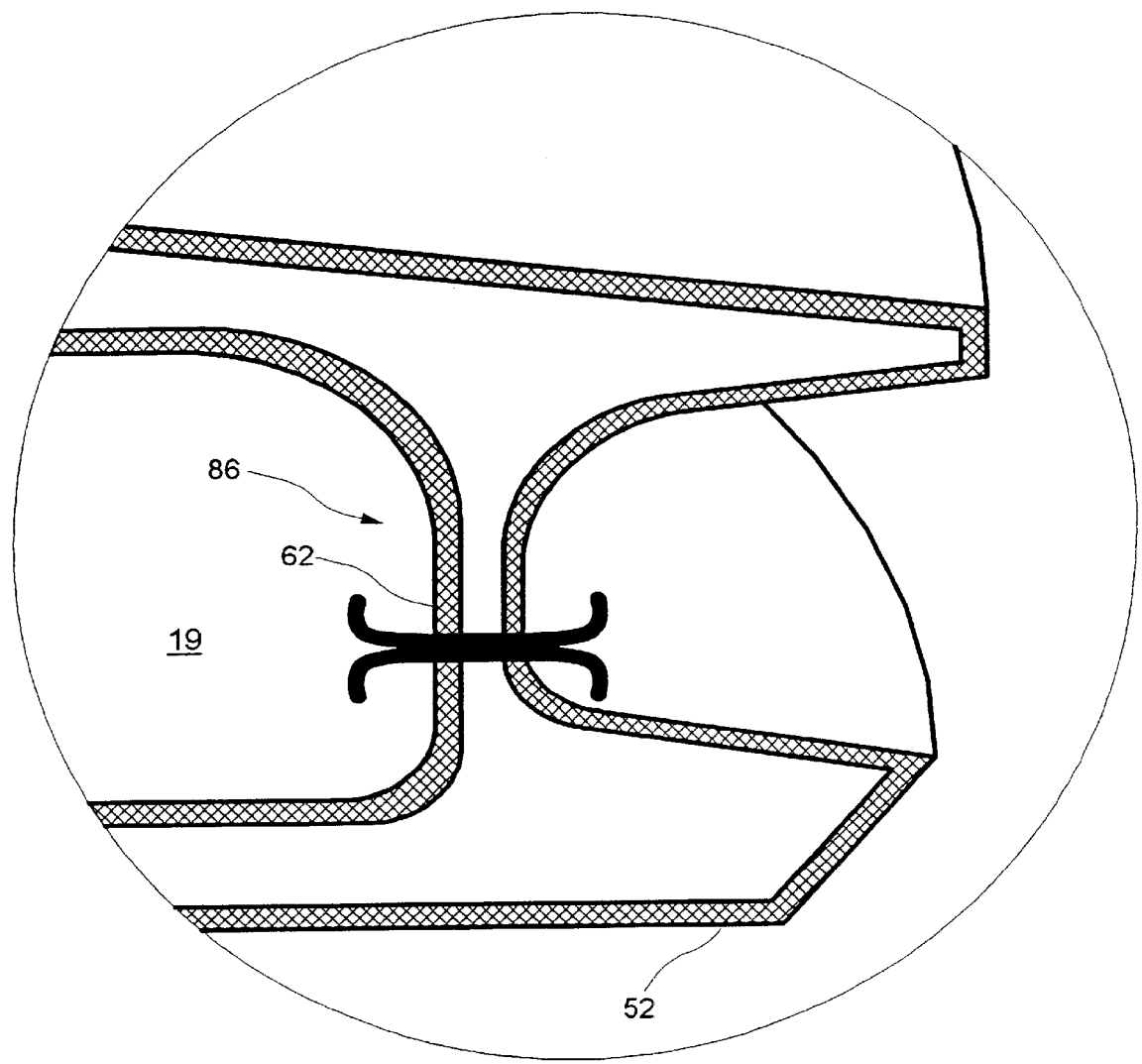
FIG. 7 schematically illustrates effects of carburization on surfaces of a valve body enclosing a hollow, wherein the hollow has fluid communication with space outside the valve body.

Conversely, carburization of valve body 102 as shown in FIG. 5B will result in carburization of interior surfaces bordering hollow 19 and longitudinal fluid passage 14. This condition is schematically illustrated in FIG. 7 wherein both an internal carburized surface layer 62 and an external carburized layer 52 are present on web 86. Note that the difference between hollow 13 in FIG. 6 and hollow 19 in FIG. 7 is the presence of internal carburized surface layer 62 enclosing hollow 19, whereas there is no such carburized layer enclosing hollow 13. Note also that welding flash 89 protrudes from the right side of web 86 into the seal retention groove, meaning that this embodiment is adapted for use with an elastomeric seal which is cast and cured in place in the seal retention groove.

In valve bodies of the present invention, where cylindrical web 16 may be carburized on one surface only (see the outer surface of web 76 in FIG. 6) or two surfaces (see the interior and outer surfaces of web 86 in FIG. 7), sufficient web thickness is provided to result in a minimum acceptable ratio of ductile metal thickness to carburized case depth of about 1:1. Note that two-surface carburization of web 86 as in FIG. 7 may be desirable for certain high-stress applications because the web 86 will have a "sandwich" structure with ductile metal serving to space apart two harder surface layers, imparting substantial resistance to crushing of the web 16" in axial compression. Where such crushing resistance is not required, one-sided carburization of the web 76 as in FIG. 6 may be used to avoid the extra cost of drilling or otherwise forming fluid passages analogous to longitudinal passage 14 in FIG. 5B.

Valve bodies of the present invention are normally carburized to an effective case depth of about 0.06 to 0.08 inches. Carburization raises the carbon content of the valve body material, which for mild steel is initially about 0.2%. At valve body surfaces exposed to carburizing furnace gases, the carbon content of mild steel is preferably raised to about 1%. This level of carbon content decreases at deeper levels of the steel below the exposed valve body surfaces. Given a surface carbon content of about 1%, the depth into the steel underlying the exposed surface at which the carbon content decreases to about 0.5% is, by industry convention, called the effective case depth. In practice, the case depth would not be exactly constant over a heat treated valve body but would vary approximately ±10% about a set point due to manufacturing tolerances inherent in presently available carburizing furnaces. Hence, preferred thicknesses specified for cylindrical webs in valve bodies of the present invention are not exact values but instead reflect design objectives preferably achieved through close control of variables in the carburizing process.

For the relatively small loads exerted on a cylindrical web in valve bodies of the present invention, a preferred minimum thickness of relatively ductile metal (i.e., metal not carburized to a carbon content greater than 0.5%) is equal to or greater than the greatest effective case depth measured on either side of the web. Therefore, assuming a one-sided carburization effective case depth of about 0.08 inches, the minimum thickness for cylindrical web 76 in a valve body having a totally enclosed interior hollow (and thus carburization on only one side of the web) will be about 0.16 inches. In contrast, assuming a carburization effective case depth of about 0.08 inches on each of two sides, the minimum thickness for cylindrical web 86 in a valve body having fluid communication between an interior hollow and space outside the valve body (and thus carburization on both sides of the web) will be approximately 0.24 inches (0.08 inches for the interior case thickness, plus 0.08 inches for the ductile core thickness, plus 0.08 inches for the exterior case thickness).

While minimum cylindrical web thickness is limited as described above, maximum web thickness is limited by the capacity of the apparatus used to join the portions of the valve body together (as, for example, by frictional or electron beam or electric arc welding). When using commercially available frictional welders having inertia wheels to join valve body portions, the practical upper limit on cylindrical boss wall thickness at the cylindrical boss mating surface in API size 7 valves is about 0.5 inches. Using frictional welders of larger capacity (or certain electric arc or electron beam welders) would allow this upper wall thickness limit to be raised.

FIG. 8 schematically illustrates a valve assembly 90 comprising a 4-web seat 79, a valve body 101, and an insert seal 8. Valve body 101 comprises a totally enclosed hollow 13, guide stems 27 and 37, an insert seal retention groove 111 into which welding flash 89 protrudes. Insert seal 8 is preferably cast and cured in place in seal retention groove 111 over welding flash 89 to reduce the incidence of seal movement and of seal out-of-round problems.

Figure 9:
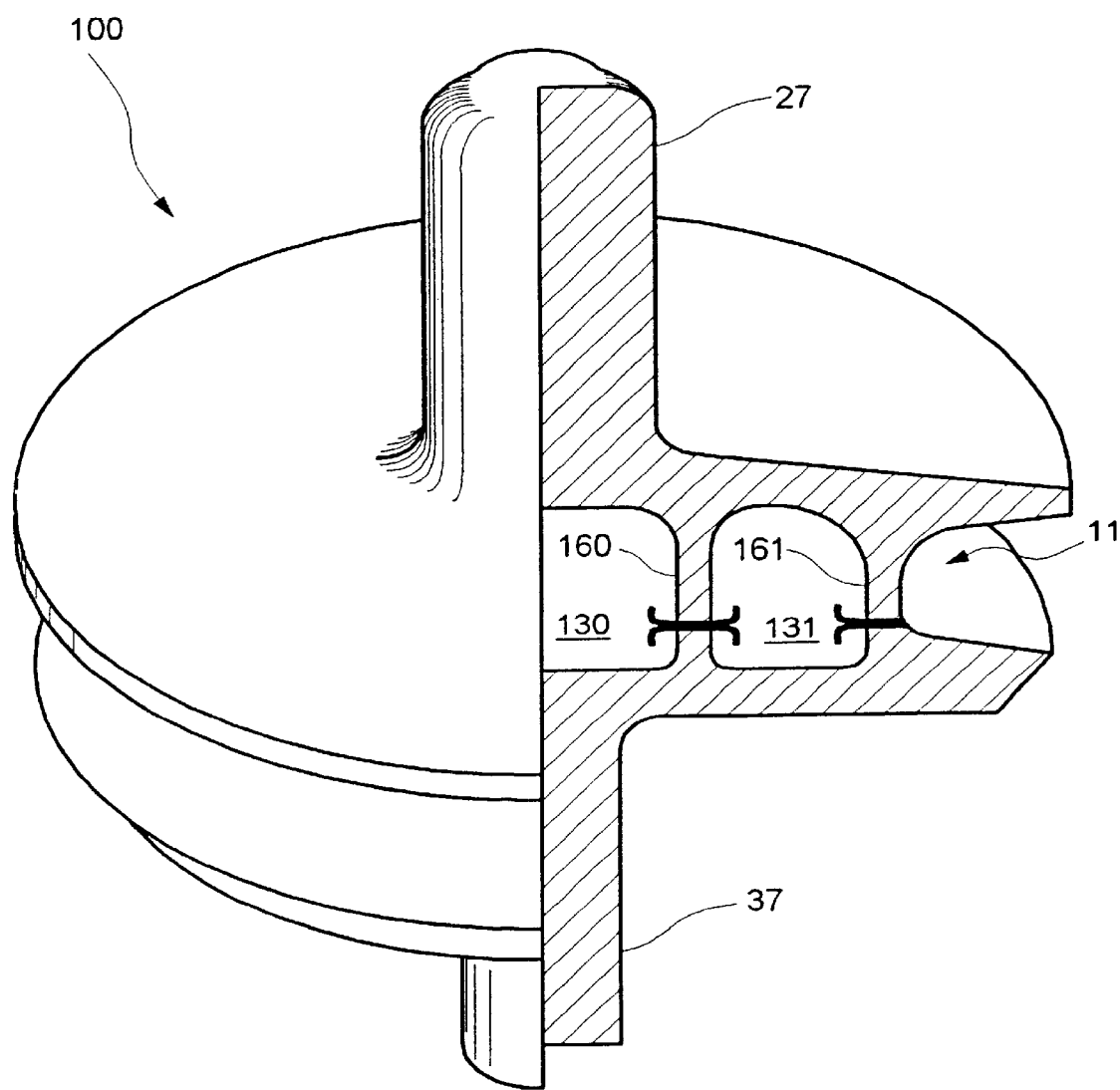
FIG. 9 illustrates a schematic view with partial cross-section of a valve body of the present invention for use in web-seat, stem-guided valves; the valve body totally encloses a toroidal hollow and a concentric cylindrical hollow.

FIG. 9 schematically illustrates a schematic view with partial cross-section of valve body 100, which has the general outward appearance of valve body 10 in FIG. 1 but a different internal structure. The internal structure of valve body 100 comprises two concentric cylindrical webs, 160 and 161, a toroidal hollow 131, and a cylindrical hollow 130. Cylindrical webs 160 and 161 act as the webs of a box beam, as described above, to impart additional resistance to distortion about radial axes to valve body 100. Note that seal retention groove 11 in valve body 100 is smoothly finished (i.e., no welding flash protruding into the groove) and thus configured to accept a snap-on elastomeric seal.

What is claimed is:

1. A valve body for use in a web-seat, stem-guided valve, the valve body comprising:
   first and second portions symmetrical about first and second longitudinal axes respectively, said first and second longitudinal axes being colinear and forming a common longitudinal axis, and said first and second portions being joined through a cylindrical web of predetermined minimum thickness,
   wherein said cylindrical web is radially spaced apart from and symmetrically disposed about said common longitudinal axis;
   wherein the valve body totally encloses a hollow; said hollow being symmetrical about said common longitudinal axis and extending radially from said common longitudinal axis to said cylindrical web;
   wherein said first portion comprises a first guide stem extending away from said hollow along said first longitudinal axis, and said second portion comprises a second guide stem extending away from said hollow along said second longitudinal axis; and
   wherein said cylindrical web spaces apart and connects opposing walls of an integral seal retention groove in the valve body.

2. The valve body of claim 1 wherein said cylindrical web thickness is everywhere at least about 0.16 inches.

3. The valve body of claim 1 or 2 further comprising an external surface carburized case having an effective case depth of about 0.08 inches.

4. The valve body of claim 1 wherein welding flash protrudes from said cylindrical web into said integral seal retention groove.

5. A web-seat, stem-guided valve comprising the valve body of claim 3, a corresponding web seat, and an elastomeric seal in said integral seal retention groove of the valve body.

6. A web-seat, stem-guided valve comprising the valve body of claim 4, a corresponding web seat, and an elastomeric seal cast and cured in said integral seal retention groove of the valve body, said seal enveloping said welding flash.

7. A valve body for use in a web-seat, stem-guided valve, the valve body comprising:
   first and second portions symmetrical about first and second longitudinal axes respectively, said first and second longitudinal axes being collinear and forming a common longitudinal axis, and said first and second portions being joined through a cylindrical web of predetermined minimum thickness;
   wherein said cylindrical web is radially spaced apart from and symmetrically disposed about said common longitudinal axis;
   wherein the valve body encloses a hollow, said hollow being substantially symmetrical about said common longitudinal axis and extending radially from said common longitudinal axis to said cylindrical web;
   wherein said first portion comprises a first guide stem extending away from said hollow along said first longitudinal axis, and said second portion comprises a second guide stem extending away from said hollow along said second longitudinal axis;
   wherein one said guide stem comprises a longitudinal fluid passage;
   wherein said hollow is in fluid communication with space outside the valve body through said longitudinal fluid passage; and
   wherein said cylindrical web spaces apart and connects opposing walls of an integral seal retention groove in the valve body.

8. The valve body of claim 7 wherein said cylindrical web thickness is everywhere at least about 0.24 inches.

9. The valve body of claim 7 or 8 further comprising a surface carburized case having an effective case depth of about 0.08 inches.

10. A web-seat, stem-guided valve comprising the valve body of claim 9, a corresponding web seat, and an elastomeric seal in said integral seal retention groove of the valve body, and wherein said longitudinal fluid passage is plugged.

11. The valve body of claim 7 wherein welding flash protrudes from said cylindrical web into said integral seal retention groove.

12. A web-seat, stem-guided valve comprising the valve body of claim 11, a corresponding web seat, and an elastomeric seal cast and cured in said integral seal retention groove of the valve body, said seal enveloping said welding flash.

13. A method of making a valve body for use in a web-seat, stem-guided valve, the method comprising steps as follows:

forging a first portion symmetrical about a first longitudinal axis, said first portion comprising a first disc-shaped body having first and second opposing sides, said first opposing side of said first disc-shaped body comprising a cylindrical boss peripherally bounding a substantially cylindrical space, and said second opposing side of said first disc-shaped body comprising a first guide stem, said first guide stem extending from said second opposing side of said first disc-shaped body along said first longitudinal axis, and said cylindrical boss comprising a cylindrical boss mating surface and having a wall thickness between about 0.16 inches about 0.5 inches at said circular boss mating surface;

forging a second portion symmetrical about a second longitudinal axis, said second portion comprising a second disc-shaped body having first and second opposing sides, said first opposing side of said second disc-shaped body comprising a circular mating surface corresponding to said cylindrical boss mating surface, and said second opposing side of said second disc-shaped body comprising a second guide stem, said second guide stem extending from said second opposing side of said second disc-shaped body along said second longitudinal axis;

mating said circular boss mating surface of said first portion and said corresponding circular mating surface of said second portion to form a circular contact area; and joining said first and second portions along said circular contact area to form a valve body comprising, as a result of said joining step, a totally enclosed hollow, a cylindrical web through which said first and second portions are joined, and an integral seal retention groove disposed peripherally between said first and second portions.

14. The method of claim 13 wherein said joining step comprises welding said first and second portions together along said circular contact area.

15. The method of claim 14 wherein said welding is frictional welding.

16. The method of claim 13, 14 or 15 comprising the additional steps of:

machining said valve body to a desired final shape, said cylindrical web having a final thickness not less than about 0.16 inches; and carburizing said machined valve body to an effective case depth of about 0.08 inches.

17. A valve body made by the method of claim 13, 14 or 15.

18. A valve body made by the method of claim 16.

19. A web-seat, stem-guided valve comprising the valve body of claim 17, a corresponding web seat, and an elastomeric seal in said integral seal retention groove of the valve body.

20. A web-seat, stem-guided valve comprising the valve body of claim 18, a corresponding web seat, and an elastomeric seal in said integral seal retention groove of the valve body.

21. A method of making a valve body for use in a web-seat, stem-guided valve, the method comprising steps as follows:

forging a first portion symmetrical about a first longitudinal axis, said first portion comprising a first disc-shaped body having first and second opposing sides, said first opposing side of said first disc-shaped body comprising a cylindrical boss peripherally bounding a substantially cylindrical space, and said second opposing side of said first disc-shaped body comprising a first guide stem, said first guide stem extending from said second opposing side of said first disc-shaped body along said first longitudinal axis, and said cylindrical boss comprising a cylindrical boss mating surface and having a wall thickness between about 0.24 inches about 0.5 inches at said circular boss mating surface;

forging a second portion symmetrical about a second longitudinal axis, said second portion comprising a second disc-shaped body having first and second opposing sides, said first opposing side of said second disc-shaped body comprising a circular mating surface corresponding to said cylindrical boss mating surface, and said second opposing side of said second disc-shaped body comprising a second guide stem, said second guide stem extending from said second opposing side of said second disc-shaped body along said second longitudinal axis;

forming a longitudinal fluid passage in one said stem guide, said fluid passage communicating with said substantially cylindrical space when said circular boss mating surface of said first portion and said corresponding circular mating surface of said second portion are mated;

mating said circular boss mating surface of said first portion and said corresponding circular mating surface of said second portion to form a circular contact area; and joining said first and second portions along said circular contact area to form a valve body comprising, as a result of said joining step, an enclosed hollow, a cylindrical web through which said first and second portions are joined, and an integral seal retention groove disposed peripherally between said first and second portions, said enclosed hollow having fluid communication with space outside said valve body through said longitudinal fluid passage.

22. The method of claim 21 wherein said joining step comprises welding said first and second portions together along said circular contact area.

23. The method of claim 22 wherein said welding is frictional welding.

24. The method of claim 21, 22 or 23 comprising the additional steps:

finish machining said valve body, said cylindrical web having a minimum thickness of about 0.24 inches;

carburizing said machined valve body to an effective case depth of about 0.08 inches; and plugging said longitudinal fluid passage.

25. A valve body made by the method of claim 21, 22 or 23.

26. A valve body made by the method of claim 24.

27. A web-seat, stem-guided valve comprising the valve body of claim 25, a corresponding web seat, and an elastomeric seal in said integral seal retention groove of the valve body.

28. A web-seat, stem-guided valve comprising the valve body of claim 26, a corresponding web seat, and an elastomeric seal in said integral seal retention groove of the valve body.

29. A method of making a valve body, the method comprising providing first and second valve body portions, said first and second portions comprising first and second disc-shaped bodies respectively, said first and second disc-shaped bodies comprising first and second corresponding circular mating surfaces respectively, at least one said circular mating surface being on a cylindrical boss;

mating said first and second portions at said first and second circular mating surfaces, said first and second disc-shaped bodies being spaced apart by said at least one cylindrical boss; and joining said mated portions by welding along said circular mating surfaces to make a valve body with a seal retention groove, said seal retention groove having opposing sides comprising peripheral areas of said first and second disc-shaped bodies, and said valve body enclosing at least one hollow.

30. A valve body made by the method of claim 29 wherein welding flash protrudes into said peripheral seal retention groove.

31. A method of anchoring an elastomeric seal within a seal retention groove, the method comprising:

forming the seal retention groove from first and second portions joined by frictional welding, welding flash from said frictional welding protruding into said groove; and coupling an elastomeric seal to said welding flash to anchor the elastomeric seal within said seal retention groove.

32. The method of claim 31 wherein said elastomeric seal is cast and cured while enveloping said welding flash within said seal retention groove, thus coupling said elastomeric seal to said welding flash.

* * * * *